United States Patent
Williams et al.

(10) Patent No.: US 6,892,347 B1
(45) Date of Patent: May 10, 2005

(54) TECHNIQUES FOR MONITORING USER ACTIVITIES AT A WEB SITE AND FOR INITIATING AN ACTION WHEN THE USER EXITS FROM THE WEB SITE

(75) Inventors: Scott L. Williams, San Francisco, CA (US); John D. Chisholm, Menlo Park, CA (US)

(73) Assignee: CustomerSat.com, Inc., Menlo Park, CA (US)

( * ) Notice: Subject to any disclaimer, the term of this patent is extended or adjusted under 35 U.S.C. 154(b) by 964 days.

(21) Appl. No.: 09/662,858

(22) Filed: Sep. 13, 2000

Related U.S. Application Data

(60) Provisional application No. 60/154,257, filed on Sep. 16, 1999.

(51) Int. Cl.[7] .............................................. G06F 17/00
(52) U.S. Cl. ........................................ 715/513; 705/14
(58) Field of Search ............................ 715/513; 705/14, 705/10; 712/227

(56) References Cited

U.S. PATENT DOCUMENTS

| | | | | |
|---|---|---|---|---|
| 5,400,248 A | | 3/1995 | Chisholm | |
| 5,740,549 A | * | 4/1998 | Reilly et al. | 705/14 |
| 5,991,735 A | * | 11/1999 | Gerace | 705/10 |
| 6,134,652 A | * | 10/2000 | Warren | 712/227 |
| 6,285,985 B1 | * | 9/2001 | Horstmann | 705/14 |
| 6,298,330 B1 | * | 10/2001 | Gardenswartz et al. | 705/14 |
| 6,317,761 B1 | * | 11/2001 | Landsman et al. | 715/513 |
| 6,334,110 B1 | * | 12/2001 | Walter et al. | 705/14 |

* cited by examiner

Primary Examiner—Sanjiv Shah
(74) Attorney, Agent, or Firm—Townsend and Townsend and Crew LLP

(57) ABSTRACT

Techniques for monitoring user activities at a web site and for initiating an action when it is determined that the user has exited the web site. In response to a user accessing a web page stored by a web site, an embodiment of the present invention periodically monitors the user's activities at the web site and checks if the user has exited the web site. At least one action is initiated when it is determined that the user has exited from the web site. According to an embodiment of the present invention, the actions comprise displaying a form to the user. Actions initiated by an embodiment of the present invention may be customized based upon user information and information about the user's activities at the web site.

37 Claims, 11 Drawing Sheets

Thank you for taking a few moments to respond to our survey. We would like to ask you a few questions about your involvement with property and casualty services. The survey should only take 3-5 minutes of your time 1) Is your company:
- ○ Insurance related
- ○ Non-Insurance related 2) Which of the following best describes your insurance-related company?
- ○ Insurer
- ○ Reinsurer
- ○ Program administrator
- ○ Agent/Broker
- ○ Managing general agent
- ○ Consultant
- ○ Claims administrator
- ○ Service provider
- ○ Insurance hardware, software provider
- ○ Academia
- ○ Trade Association/Professional Society 3) Which of the following best describes your role?
- ○ Agent/Broker
- ○ Insurance company executive, staff, manager
- ○ Claims/Loss control professional
- ○ Technical support vendor 4) Which industry associations or societies do you belong to? (check all that apply)
- ☐ National Association of Independent Insurers
- ☐ Independent Insurance Agents Of America
- ☐ National Association of Professional Insurance Agents
- ☐ Insurance Accounting and Systems Association
- ☐ CPCU Society
- ☐ Insurance Information Institute
- ☐ Insurance company association (such as American Insurance Association (AIA), National Association of Mutual Insurance Companies, or Alliance of American Insurers, for instance)

5) Why do you visit AcmeInsurance.com? (check all that apply)
- ☐ Gather insurance product information
- ☐ Search for new insurance services
- ☐ Research technical and regulatory information
- ☐ Search the industry directory

Fig. 10A

☐ Read daily news updates

☐ To read about electronic distribution issues

☐ To read about federal legislation and regulatory agency actions

☐ Buy products or services (Infostore, books)

☐ Learn of events

☐ Get training information

☐ Career center

6) In what ways do you deliver your message to customers? (check all that apply)

☐ Direct mail

☐ Corporate client activities

☐ General image advertising

☐ Direct response ads

☐ TV/Radio advertising

Fig. 10B

TECHNIQUES FOR MONITORING USER ACTIVITIES AT A WEB SITE AND FOR INITIATING AN ACTION WHEN THE USER EXITS FROM THE WEB SITE

CROSS-REFERENCES TO RELATED APPLICATIONS

This application claims priority from U.S. Provisional Patent Application No. 60/154,257, entitled "METHOD FOR SENSING AND INITIATING AN ACTION WHEN A VISITOR EXISTS FROM A WEB SITE," filed Sep. 16, 1999, the entire disclosure of which is herein incorporated by reference for all purposes.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the U.S. Patent and Trademark Office patent file or records, but otherwise reserves all copyright rights whatsoever.

BACKGROUND OF THE INVENTION

The present invention relates to the use of communication networks, such as the Internet, and more particularly to techniques for sensing when a user exits from a particular web site, and initiating an action upon the user's exit from the web site.

As a result of the blossoming electronic commerce industry, an increasing number of organizations, including businesses and individuals, are now using the Internet as a medium for selling products and services. In the World Wide Web (the "Web") environment, the products and services are generally offered for sale using hypertext documents called "web pages" which can be accessed by users of the Internet. These web pages are usually written in Hypertext Markup Language (HTML) and may incorporate any combination of text, graphics, audio and video content, software programs, and other data. Web pages may also contain hypertext links to other web pages. Each web page is uniquely identified by an address called a Uniform Resource Locator (URL) that enables users of the Internet to access the web page. Web pages are typically stored at web sites on computer systems, called web servers, coupled to the Internet. A web site may store one or more web pages.

Computer systems connected to the Internet may be characterized as "clients" or "servers" depending on the role the computer systems play with respect to requesting information or providing information. Client computers are computers that typically request information from a server computer which provides the information. Server systems are typically responsible for receiving information requests from client systems, performing processing required to satisfy the requests, and for forwarding the results corresponding to the information requests back to the requesting client systems. The processing required to satisfy the client request may be performed by a single server or may alternatively be delegated to other servers connected to the Internet. A computer system may function both as a client and a server.

Users typically access and view web pages using a program called a "web browser" which executes on a client computer coupled to the Internet. Users may access web pages by providing URL information to the browser, either directly or indirectly. The web page request is then communicated to a web server storing the web page. The web page corresponding to the URL is then downloaded to the requesting client computer and may be viewed by the user via the browser. Examples of browsers include the Internet Explorer browser program provided by Microsoft Corporation, the Netscape Navigator browser provided by Netscape Corporation, and others.

Due to the rapid increase in the number of organizations transacting business over the Internet, the success or failure of an organization generally depends on the organization's ability to acquire and retain customers online. In order to improve customer retention, organizations frequently request feedback from users regarding the quality of products/services offered by the organization, the ease of doing business with the organization, and the like. The user feedback is used to measure customer satisfaction and loyalty, provide strategic and operational information about the organization, provide statistics related to the organization's operations, and provide other information which facilitates customer relationship management.

Organization web sites generally solicit user feedback via data forms and surveys ("forms" in general) which are presented to the user. Several techniques are conventionally used to present the forms to the user. According to one technique, the forms are stored as static web pages with fixed URL addresses. In order to invoke this type of form, a user has to find the URL for the form, provide the URL information to the browser to retrieve the form, and then provide feedback on the form. Since this takes time and extra initiative on part of the user, the effectiveness of this technique to collect user feedback is very limited.

According to another technique, URLs corresponding to the form web pages are embedded as links in one or more web pages stored by a web site. In order to access a form, the user is required to select and click on a form URL link to access the form web page. However, since the URL links are passive and require user initiative to select them, the effectiveness of this technique is also limited.

According to a more recent technique, forms are presented to the user using "pop-up" technology. Pop-up forms may be presented to a user automatically when the user accesses a specific web page. The pop-up form is usually presented in a separate window, browser, frame, or page. The web site may be configured to present a pop-up form to every user accessing a web site, to every "Nth" user accessing the web site, to a random sample of users, or the like. In this manner, the form is actively presented to the user without requiring user action or initiative. The user is required take some action to respond to the form, even if only to close the pop-up window displaying the form.

Although pop-up forms present advantages over other techniques discussed above, they also suffer from several limitations. For example, when displaying a form to a user, it is desirable that the contents of the form reflect and be relevant to the user's interactions with the web site. Conventional pop-up forms are not capable of keeping track of the user's interactions, and thus their contents cannot be personalized for a particular user. As a result, the form presented to the user may be inappropriate for the particular user. It is also desirable that a form not be presented to the user until the user has completed all interactions with the web site so that the user's flow of interactions is not interrupted by the pop-up form. However, conventional pop-up forms have no way of determining if the user has completed his/her interactions with the web site.

Consequently, conventional pop-up forms may be presented while the user is browsing the web site, and may thus interrupt the user's activity at the web site.

Thus, there is a need for techniques which can track a user's interactions at a web site, and sense when the user exits from the web site. It is desirable that actions, such as presenting a form to the user, be initiated only when the user exits from the web site. It is also desirable that the actions initiated be customized based upon the user's interactions with the web site.

SUMMARY OF THE INVENTION

According to an embodiment of the present invention, techniques are disclosed for monitoring a user's activities at a web site, sensing when the user exits the web site, and for initiating at least one action when the user exits the web site. According to an embodiment of the present invention, the action may comprise displaying a form to the user. According to an embodiment of the present invention, the form displayed to the user may be customized based upon the user's activities at the web site and user related information.

According to an embodiment of the present invention, techniques are provides for initiating an action upon exit from a web site. A user may access the web site using a first browser executing on a user system. Upon accessing the web site, processing is performed by the user system to periodically monitor user activities to determine if the first browser has exited the web site. At least one action may be initiated upon determining that the first browser has exited the web site.

According to an embodiment of the present invention, in order to periodically monitor user activities and to determine if the user has exited the web site, a second browser is invoked on the user system and a web page from the web site accessed by the user using the first browser is loaded into the second browser. Loading of the web page initiates a timer which is configured to generate a signal at periodic time intervals. When the timer generates a timer signal, the user system monitors activities performed by the user at the web site and determines if the user has exited the web site.

According to an embodiment of the present invention, various actions may be initiated when it is determined that the user has exited the web site. According to a specific embodiment of the present invention, upon determining that the first browser has exited the web site, a message is communicated from the user system to a server indicating that the first browser has exited the web site. The user system receives a form from the server in response to the message. The user system may then output the form to the user.

According to another embodiment of the present invention, upon determining that the first browser has exited the web site, a message is communicated from the user system to a server indicating that the first browser has exited the web site. The message also includes information related to the user and information related to activities performed by the user at the web site. The user system then receives a form from the server in response to the message. The form is personalized for the user based upon the information included in the message. The user system may then output the form to the user.

The foregoing, together with other features, embodiments, and advantages of the present invention, will become more apparent when referring to the following specification, claims, and accompanying drawings.

BRIEF DESCRIPTION OF THE DRAWINGS

FIGS. 10A and 10B depict an exemplary form which may be displayed to a user according to an embodiment of the present invention.

DESCRIPTION OF THE SPECIFIC EMBODIMENTS

According to an embodiment of the present invention, techniques are disclosed for monitoring a user's activities at a web site, sensing when the user exits the web site, and for initiating actions when the user exits the web site. Actions initiated by an embodiment of the present invention may also be customized based upon the user's activities at the web site. According to an embodiment of the present invention, the actions comprise displaying a form to the user to collect user feedback.

Figure 1:
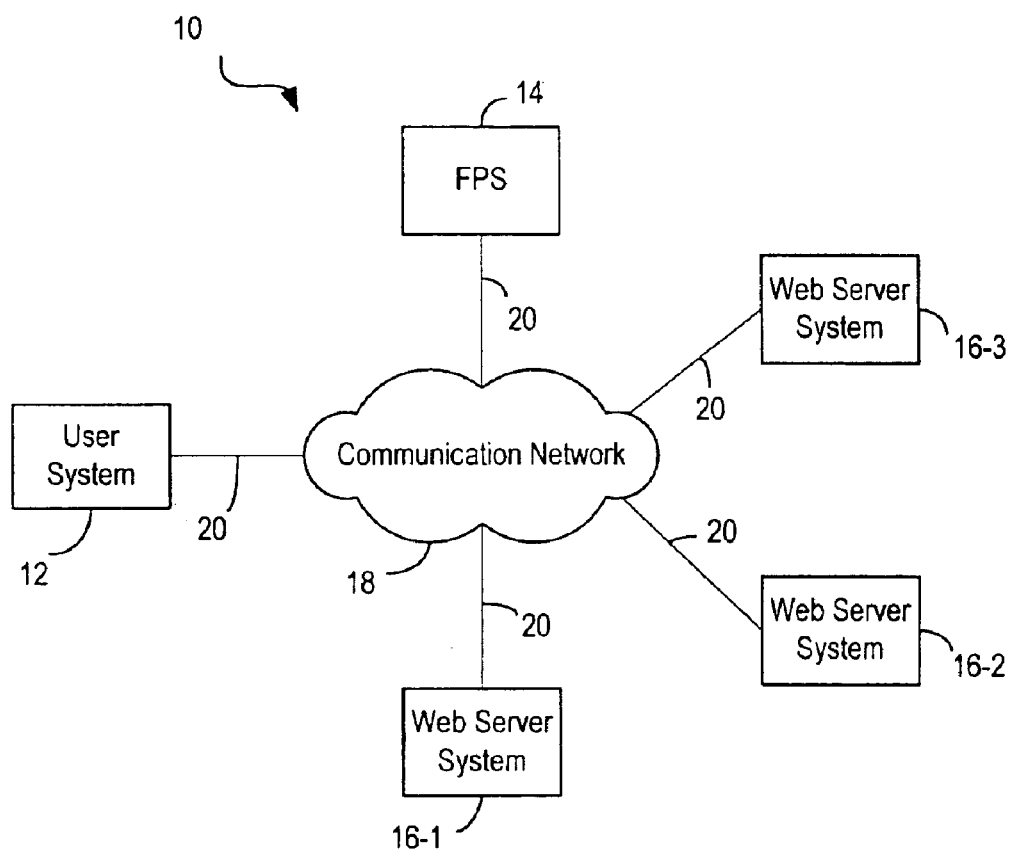
FIG. 1 is a simplified block diagram of a distributed computer network which may incorporate an embodiment of the present invention.

FIG. 1 is a simplified block diagram of a distributed computer network 10 which may incorporate an embodiment of the present invention. Computer network 10 includes a number of computer systems 12, 14, 16-1, 16-2, and 16-3 coupled to a communication network 18 via a plurality of communication links 20. Communication network 18 provides a mechanism for allowing the various components of computer network 10 to communicate and exchange information with each other. Communication network 18 may itself be comprised of many interconnected computer systems and communication links. Communication links 20 may be hardwire links, optical links, satellite or other wireless communication links, wave propagation links, or any other mechanisms for communication of information. While in one embodiment, communication network 18 is the Internet, in other embodiments, communication network 18 may be any suitable computer network.

The computer systems depicted in FIG. 1 may include a user system 12, a forms provider system (FPS) 14, and a plurality of web server systems 16. Distributed computer network 10 depicted in FIG. 1 is merely illustrative of an embodiment incorporating the present invention and does not limit the scope of the invention as recited in the claims. One of ordinary skill in the art would recognize other variations, modifications, and alternatives. For example, although only one user system 12 is shown in FIG. 1, it should be apparent that a plurality of user systems may be coupled to communication network 18 according to other embodiments of the present invention.

Figure 2:
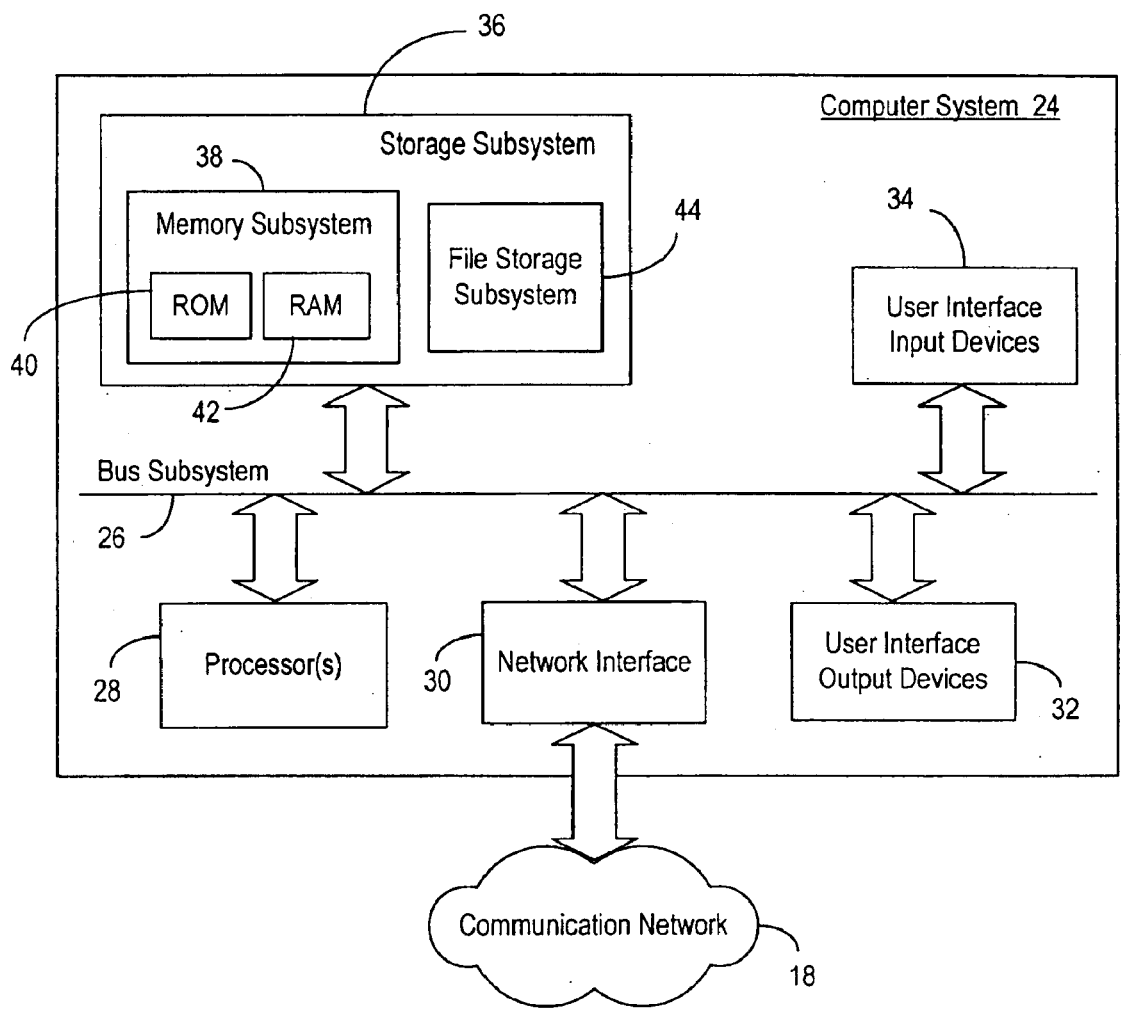
FIG. 2 is a simplified block diagram of an exemplary computer system according to an embodiment of the present invention.

FIG. 2 is a simplified block diagram of an exemplary computer system 24 according to an embodiment of the present invention. Computer system 24 may function as user system 12, FPS 14, web server system 16, or combinations thereof. Computer system 24 typically includes at least one processor 28 which communicates with a number of peripheral devices via a bus subsystem 26. These peripheral devices may include a storage subsystem 36, comprising a memory subsystem 38 and a file storage subsystem 44, user interface input devices 34, user interface output devices 32, and a network interface subsystem 30. The input and output devices allow users of computer system 24, for example, users, web site providers, and providers of FPS 14, to interact with computer system 24. Network interface subsystem 30 provides an interface to outside networks, including an interface to communication network 18, and is coupled via communication network 18 to corresponding interface devices in other computer systems.

User interface input devices 34 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 24 or onto computer network 18.

User interface output devices 32 may include a display subsystem, a printer, a fax machine, or non-visual displays such as audio output devices. The display subsystem may be a cathode ray tube (CRT), a flat-panel device such as a liquid crystal display (LCD), a projection device, and the like. The display subsystem may also provide non-visual display such as via audio output devices. In general, use of the term "output device" is intended to include all possible types of devices and ways to output information from computer system 24 to a user or to another machine or computer system.

Storage subsystem 36 stores the basic programming and data constructs that provide the functionality of the various embodiments of the present invention. For example, databases and modules implementing the functionality of the present invention may be stored in storage subsystem 36. These software modules are generally executed by processor 28. In a distributed environment, the software modules may be stored on a plurality of computer systems and executed by processors of the plurality of computer systems. Storage subsystem 36 typically comprises memory subsystem 38 and file storage subsystem 44.

Memory subsystem 38 typically includes a number of memories including a main random access memory (RAM) 42 for storage of instructions and data during program execution and a read only memory (ROM) 40 in which fixed instructions are stored. File storage subsystem 44 provides persistent (non-volatile) storage for program and data files, and may include a hard disk drive, a floppy disk drive along with associated removable media, a Compact Digital Read Only Memory (CD-ROM) drive, an optical drive, or removable media cartridges. One or more of the drives may be located at remote locations on other connected computers at other sites coupled to communication network 18. The databases and modules implementing the functionality of the present invention may also be stored by file storage subsystem 44.

Bus subsystem 26 provides a mechanism for letting the various components and subsystems of computer system 24 communicate with each other as intended. The various subsystems and components of computer system 24 need not be at the same physical location but may be distributed at various locations within distributed network 10. Although bus subsystem 26 is shown schematically as a single bus, alternate embodiments of the bus subsystem may utilize multiple busses.

Computer system 24 itself can be of varying types including a personal computer, a portable computer, a workstation, a computer terminal, a network computer, a television, a mainframe, or any other data processing system. Due to the ever-changing nature of computers and networks, the description of computer system 24 depicted in FIG. 2 is intended only as a specific example for purposes of illustrating the preferred embodiment of the present invention. Many other configurations of computer system 24 are possible having more or less components than the computer system depicted in FIG. 2. As previously stated, computer systems may be characterized as clients or server. For example, user system 12 generally functions as a client while web server system 16 and FPS 14 generally function as servers. Client computer systems and server computer systems generally have the same configuration as computer system 24 depicted in FIG. 2, with the server systems typically having more storage capacity and computing power than the client computer systems.

User system 12 enables a user to access various resources distributed within computer network 10. These resources include web pages stored by web sites which are hosted by one or more web servers 16. Using a browser executing on user system 12, a user may retrieve and view web pages stored by one or more web sites. According to an embodiment of the present invention, online forms may also be displayed to the user via the browser executing on user system 12.

Web server systems 14 host one or more web sites which can be accessed by the users. Each web site hosted by a web server may store one or more web pages which may be accessed by the user via user system 12.

FPS 14 generally functions as a server and may be configured to store modules which facilitate the monitoring of user activities at a web site and which initiate actions when the user exits from the web site. According to an embodiment of the present invention, the modules stored by FPS 14 may be downloaded to user system 12 for execution by user system 17. According to another embodiment of the present invention, FPS 14 may be configured to generate forms which may be presented to the user when the user exits a web site. These forms may be customized based upon user-related information, information about the user's actions, and transactions entered into by the user at the web site. According to a specific embodiment of the present invention, these forms may be stored as web pages at a web site hosted by FPS 14. Alternatively, the forms may be stored by the web servers.

Figure 3:
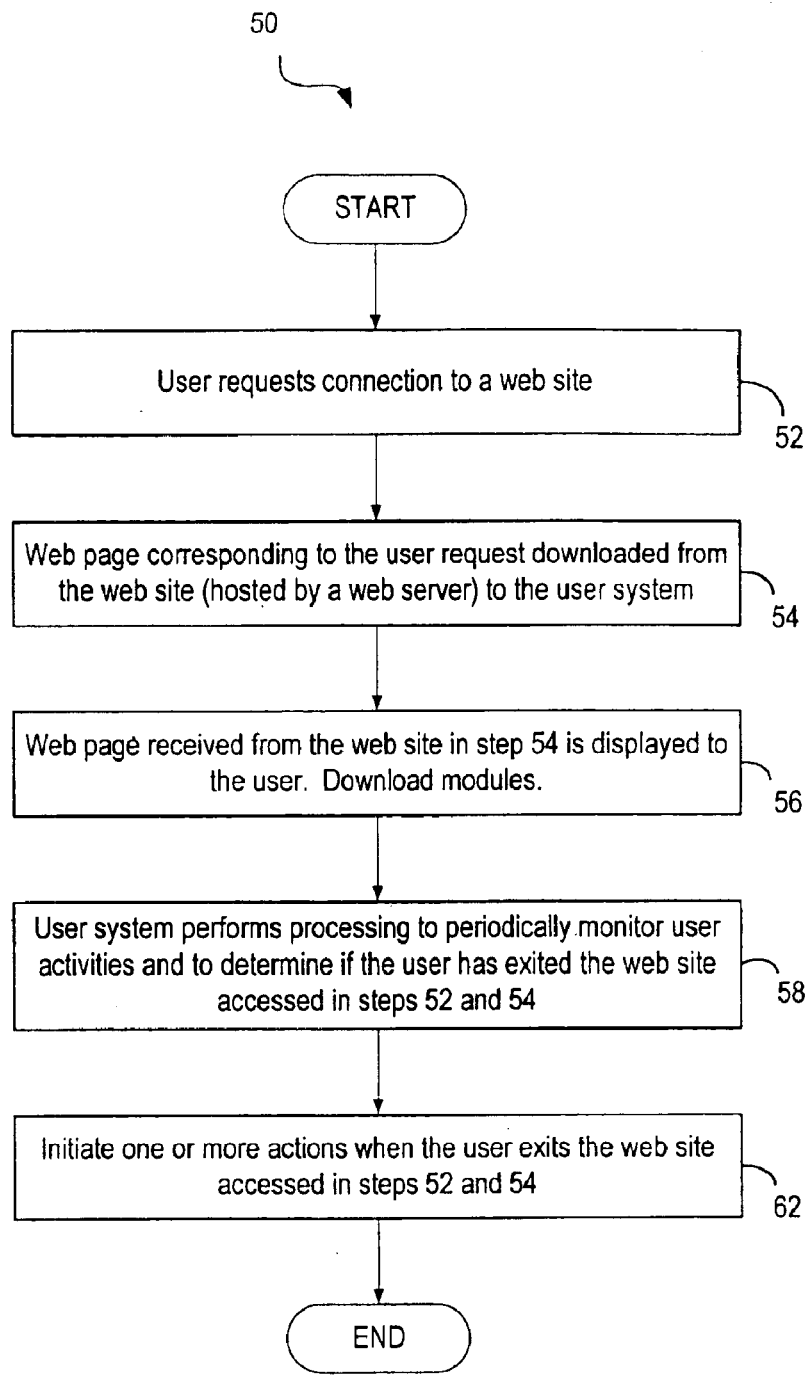
FIG. 3 depicts a simplified flowchart showing processing performed by an embodiment of the present invention.

FIG. 3 depicts a simplified flowchart 50 showing processing performed by components of the present invention according to an embodiment of the present invention. As shown in FIG. 3, processing is initiated when a user, via a browser executing on user system 12, requests connection to a particular web site (step 52). A user may access a web site by providing URL information for a web page stored by the web server to the browser, and requesting the browser to retrieve the web page corresponding to the URL from the web site. The user may provide the URL directly by typing the URL information in an input space provided on the browser, or by selecting and clicking on a URL link displayed to the user on a web page displayed by the browser, or by using other like techniques.

The user's web page request is communicated to a web server 16 hosting the web site storing the requested web page, and the web server responds by downloading the requested web page to user system 12 (step 54). In a specific embodiment of the present invention, the web page downloaded from web server system 16 is a HTML document. A HTML document comprises text to be shown to the user, and tags defining how the text is to be displayed to the user. HTML documents may also contain statements which embed applets/modules in the HTML document, or enable the loading and execution of Java-based, platform independent applets/module over the Internet. For further discussion about HTML documents please refer to "HTML: The Definitive Guide, Third Edition," by Chuck Musciano and Bill Kennedy, published by O'Reilly & Associates, Inc., the entire contents of which are incorporated by reference into this application for all purposes.

User system 12 may then display the web page downloaded from the web site to the user (step 56). According to an embodiment of the present invention, displaying the web page may cause the browser executing on user system 12 to download one or more modules from FPS 14. These modules may be configured to perform functions such as monitoring user activities at the web site, sensing when the user exits from the web site accessed in steps 52 and 54, initiating at least one action when the user exits from the web site, and other like functions.

According to an embodiment of the present invention, the web page downloaded from the web site in step 54 contains statements/instructions which instruct the browser to download the modules from FPS 14. For example, if the web page downloaded from web server 16 is a HTML document, the HTML web page may contain embedded applets/modules, or may contain statements/instructions to enable loading and execution of Java-based, platform independent applets/modules over the Internet.

Figure 4:
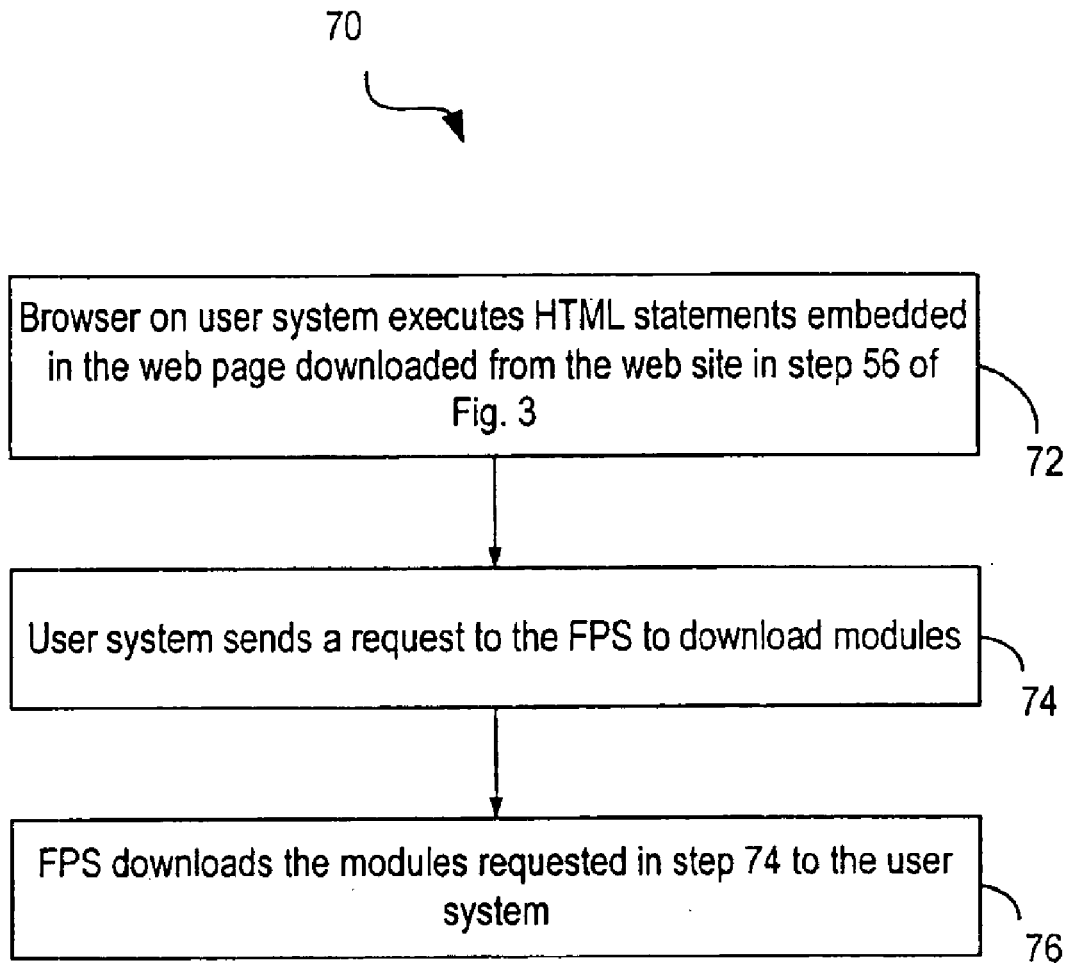
FIG. 4 depicts a simplified flowchart showing processing performed by an embodiment of the present invention for downloading modules to a user system.

FIG. 4 depicts a flowchart 70 showing processing performed by user system 12 and FPS 14 to download modules according to an embodiment of the present invention (part of step 56 in FIG. 3). According to this embodiment, statements instructing the browser to download one or more modules are embedded in the web page downloaded from the web site hosted by web server 16 in step 56 of FIG. 3. An example of such a statement is:

<SCRIPT SRC="www.customersat.net/module__1.asp">

The value of the "SRC" attribute is the URL of the file containing the module to be downloaded. The HTML statement shown above causes the browser to download module "module__.asp" from the web site "www.customersat.net" which may be hosted by FPS 14. In the above example, the module is a JavaScript program. It should be apparent that one or more of the above described statements may be embedded in the web page to enable download of one or more modules.

As shown in FIG. 4, the browser executing on user system 12 executes HTML statements while displaying the HTML page to the user (step 72). For example, the HTML statement shown above is executed by the browser executing on user system 12 and causes user system 12 to send a request to FPS 14 to download one or more modules indicated in the HTML statement (step 74). In response to the request, FPS 14 downloads the requested modules to user system 12 (step 76). In alternate embodiments of the present invention, the modules may also be downloaded from web server 16 hosting the web site which stores the web page displayed to the user.

Figure 5:
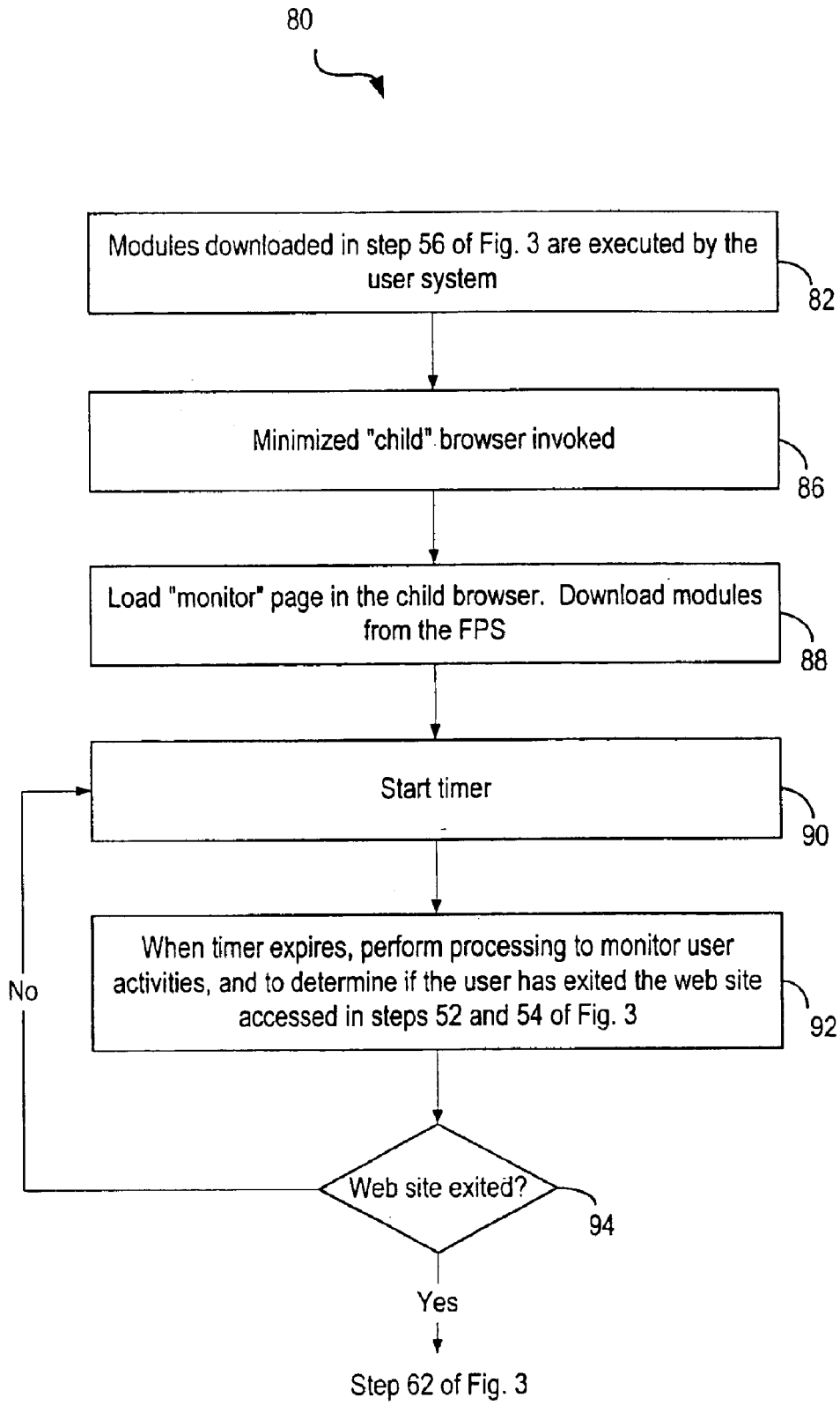
FIG. 5 depicts a simplified flowchart showing processing performed by an embodiment of the present invention to monitor user activities and to determine when a user exits a web site.

Referring back to FIG. 3, user system 12 then performs processing to periodically monitor user activities and to determine when the user exits the web site accessed in steps 52 and 54 (step 58). FIG. 5 depicts a simplified flowchart 80 showing details of processing performed by an embodiment of the present invention to monitor user activities and to determine when the user exits the web site according to step 58 of FIG. 3. As shown in FIG. 5, processing is initiated when the modules downloaded in step 56 of FIG. 3, are executed by user system 12 (step 82). In this embodiment of the present invention, execution of the module invokes a new (or second) minimized browser (step 86). The second browser is spawned as a result of instructions embedded in the web page displayed in the first browser. Accordingly, the first browser may be referred to as the "parent browser" and the second minimized browser may be referred to as the "child" browser.

The modules may then instruct the minimized child browser to load a specially configured web page from the web site hosted by web server 16 and which stores the web page downloaded in step 54 of FIG. 3 (step 88). This specially configured web page may be referred to as the "monitor" web page, since it facilitates monitoring of user activities and sensing of when the user exits the web site. According to an embodiment of the present invention, the monitor web page is configured by providers of FPS 14 and stored at the web site accessed by the user in steps 52 and 54 depicted in FIG. 3. The monitor web page may contain embedded modules/applets or may contain instructions which cause modules/applets to be downloaded from FPS 14 to user system 12. For example, statements such as those previously discussed may be used to download the modules. The modules may be downloaded based upon the types of the parent and child browsers. For example, Visual Basic scripts (VBScripts) may be downloaded if the browsers are Internet Explorer browsers, and JavaScripts may be downloaded for other browsers.

Figure 6:
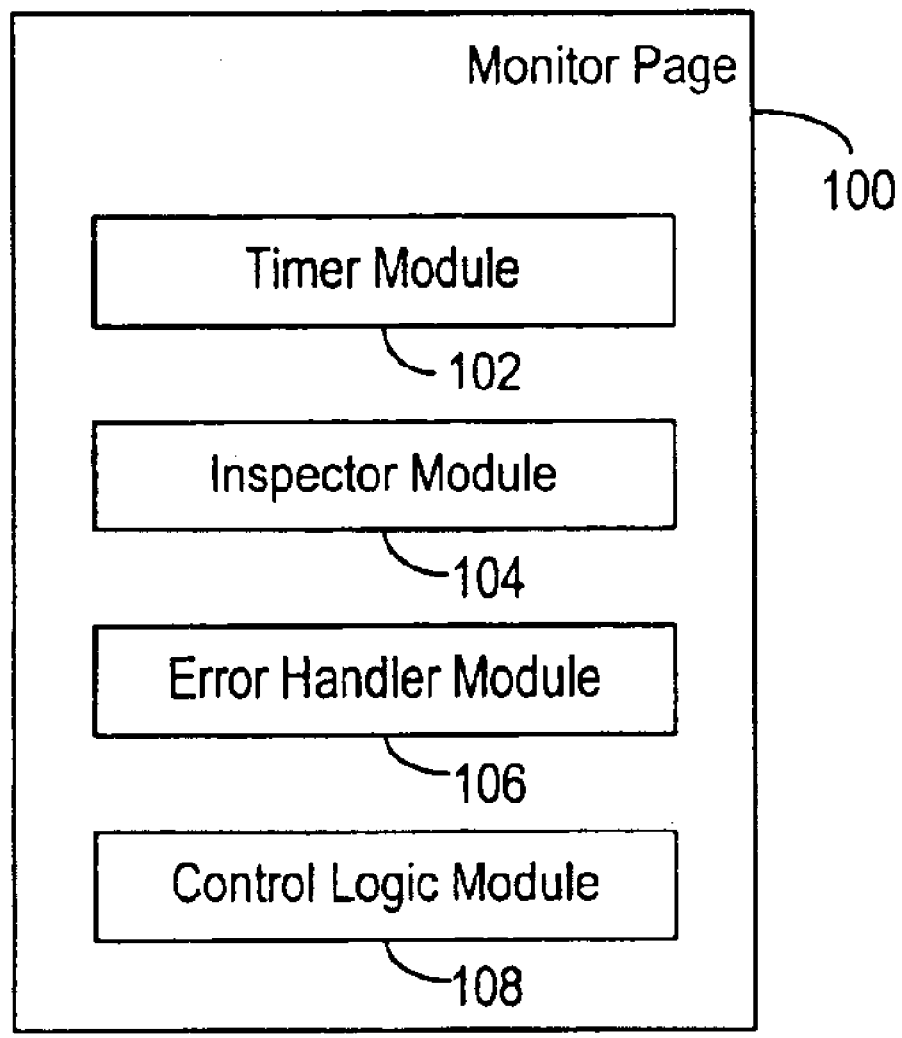
FIG. 6 depicts a monitor page and associated modules according to an embodiment of the present invention.

According to a specific embodiment of the present invention, as depicted in FIG. 6, the modules or applets embedded or downloaded by a monitor page 100 may include a timer module 102 which performs timer related functions, an inspector module 104 which inspects properties of web pages displayed in the parent browser, an error/exception handler module 106 which handles processing of exceptions and error conditions, one or more control logic modules 108, and other modules. It should be apparent that a monitor web page may contain more or less modules than those depicted in FIG. 6.

Referring back to FIG. 5, the modules embedded in or downloaded by the monitor page are then executed by user system 12 and initiate a timer function (step 90). The timer is configured to periodically generate a signal after a preconfigured time duration. For example, in a specific embodiment the timer may be configured to generate a timeout signal every 1 second. In a specific embodiment, the timer functionality is provided by timer module 102.

According to an embodiment, every time that timer generates the signal after the time period, processing is performed by user system 12 to record information about the user's activities, and to determine if the user has exited from the web site accessed in steps 52 and 54 (step 92). In a specific embodiment, the timeout signal generated by timer module 102 is received by inspector module 104. Upon receiving the signal, inspector module 104 performs processing to monitor user activities and to determine if the user has exited the web site accessed in steps 52 and 54 (step 92).

Monitoring user activities may include collecting information related to the user and information related to activities performed by the user at the web site. In a specific embodiment of the present invention, information related to the user may include information about the user's name, address, demographics, gender, profession, and the like. Information related to activities performed by the user at the web site may include information about web pages stored by the web site which are accessed by the user, the user's interactions with the web pages, transactions performed by the user at the web site, and other like information. For each web page accessed by the user, the present invention may determine the URL information for the web page, the contents of the web page, and other like information. For each transaction entered into by the user, the present invention may collect information about the date of the transaction, items (including good or services) involved in the transaction, quantity of items purchased by the user, the price of the purchased items, the manufacturers or providers of the purchased items, and other like information. The information gathered by inspection module 104 may be stored on storage subsystem 36 of user system 12.

Inspector module 104 then determines if the user has exited the web site or web domain accessed by the user in step 52 (steps 92 and 94). In general, the present invention determines if the user has exited the web site by determining characteristics of the web page being currently displayed to the user in the parent browser, and comparing them with characteristics of the monitor web page displayed in the child browser. Based upon the comparison, user system 12 determines whether the user has exited the web site accessed in steps 52 and 54 depicted in FIG. 3. For example, if the web site information contained in the URL of the web page displayed in the parent browser is different from the web site information for the monitor web page displayed in the child browser, it may indicate that the user has exited the first web site. If it is determined that the user has exited the web site, processing continues with step 62 of FIG. 3 wherein at least one action may be initiated in response to the user's exit. Alternatively, if it is determined that the user has not exited the web site, processing continues with step 90 and the timer is restarted.

Figure 7:
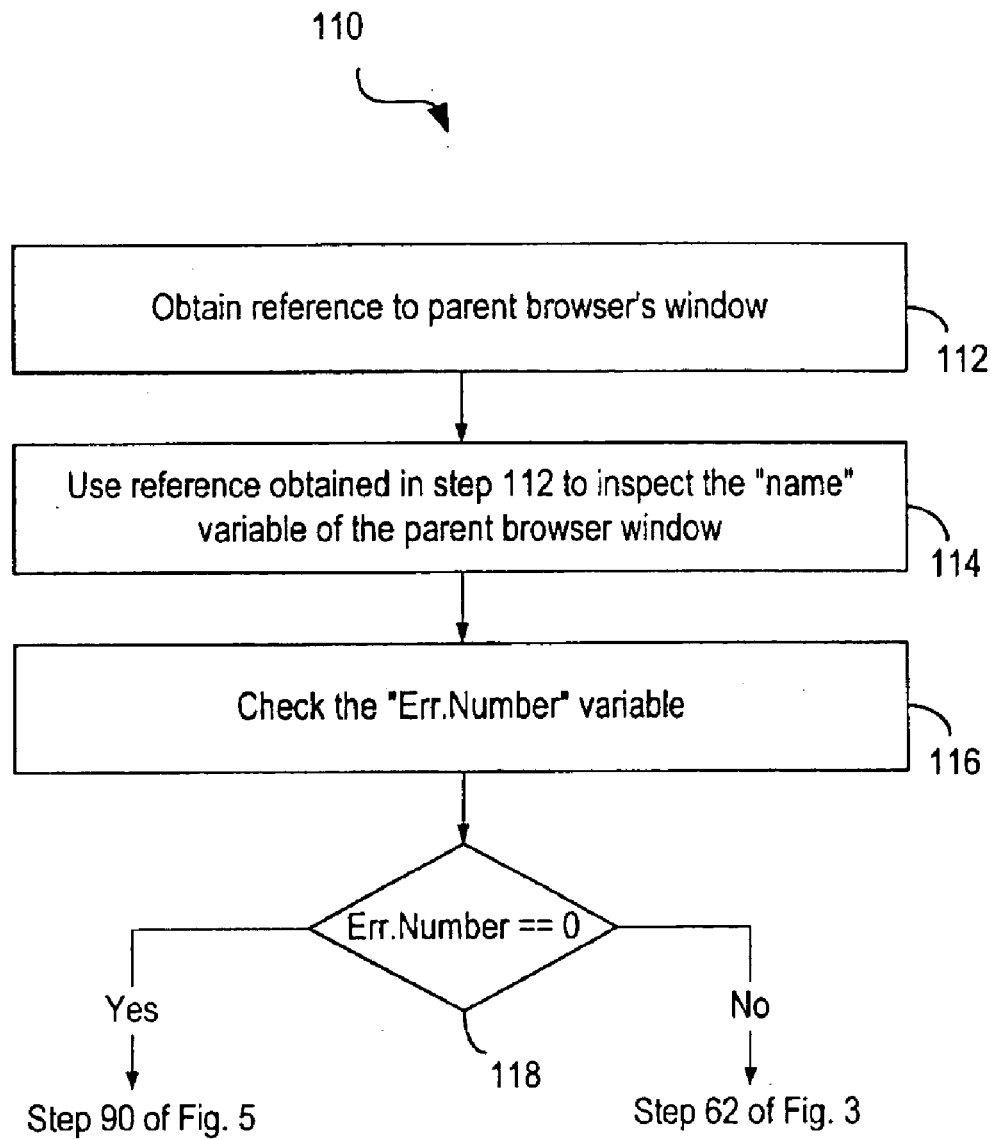
FIG. 7 depicts a simplified flowchart showing processing performed by an embodiment of the present invention for Internet Explorer browsers.

Processing performed by inspector module 104 in steps 92 and 94 may depend on the type of the parent and child browser. FIG. 7 depicts a simplified flowchart 110 showing processing performed during steps 92 and 94 of FIG. 5 by an embodiment of the present invention for Internet Explorer browsers and Internet Explorer compatible browsers. As shown in FIG. 7, user system 12 executes a VBScript downloaded/embedded in the monitor page to obtain a reference to the parent browser's window (step 112). A reference may be a pointer or a data variable which may be used by the child browser window to inspect properties/attributes/variables, such as name, domain, URL, etc, related to the parent browser window. In a specific embodiment, user system 12 accesses a reference to the parent browser's VBScript "Window" object. The reference obtained in step 112 is then used to inspect the "name" variable of the parent browser window (step 114).

Inspector module 104 executing on user system 12 may then check the "Err.Number" global variable associated with the VBScript (steps 116 and 118). If the value of the "Err.Number" variable is zero, it indicates that no error occurred when user system 12 attempted to inspect the "name" variable, implying that the parent browser and the child browser are pointed to the same web site, i.e. the web site accessed by the user in step 52 of FIG. 3. This implies that the user has not exited from the web site. In this scenario, processing then continues with step 90 of FIG. 5. However, if the "Err.Number" variable is not equal to zero, it indicates that an error occurred when user system 12 attempted to read the "name" variable, implying that the child browser and the parent browser are pointing to different web sites. This implies that the user has exited from the web site accessed in steps 52 and 54. Processing then continues with step 62 of FIG. 3 which initiates at least one action in response to the user's exit from the web site.

An exemplary VBScript for determining if a user has exited from a web site for Internet Explorer browsers is shown below;

---

```
VBScript:
'Executed every "x" seconds (where "x" is the timer timeout duration)
'Get the reference to the parent browser's window
    Set hParent = window.opener 'window.open (" ", "MyParent")
'Now inspect the "name" variable of the parent. A failure to read "name"
causes the VBScript
' "Err.Number" variable to be set to a non-zero value.
    strName = hParent.name
    If( Err.Number <> 0) Then
    bSuccess = False       'Implies user may have exited the web site
Else
    bSuccess = True        'Implies that the user has not exited
    the web site
End If
```

---

Figure 8:
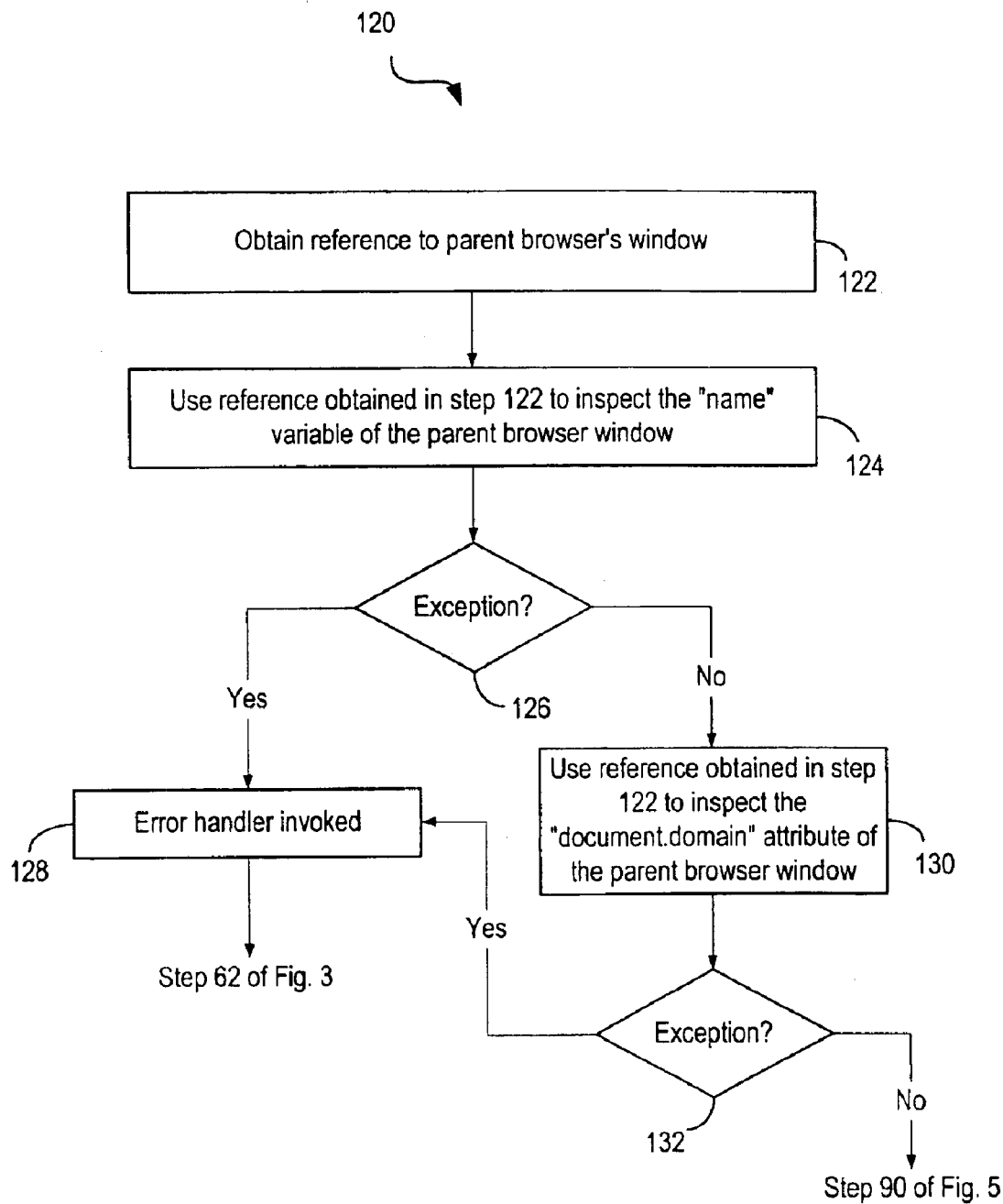
FIG. 8 depicts a simplified flowchart showing processing performed by an embodiment of the present invention for non-Internet Explorer browsers.

FIG. 8 depicts a simplified flowchart 120 showing processing performed during steps 92 and 94 in FIG. 5 by an embodiment of the present invention for non-Internet Explorer browsers. As shown in FIG. 8, a JavaScript module, downloaded by or embedded in the monitor page, is executed to obtain a reference to the parent browser's window (step 122). In a specific embodiment, a reference to the parent browser's Javascript "window" object is obtained. The reference obtained in step 122 is then used to inspect the "name" variable of the parent browser window (step 123). This may cause a JavaScript error exception to occur if the parent browser is pointed to a different web site than the child browser (step 126). The exception indicates that the user has exited from the web site accessed in steps 52 and 54 depicted in FIG. 3. If an exception is caused, error/exception handler module 106 is invoked (step 128) which may then initiate at least one action in response to the user exiting the web site (step 62 of FIG. 3). If no exception is raised, processing proceeds with step 130.

In certain browsers, an exception may not occur while reading the "name" variable (i.e. in step 124) even if the parent browser and child browser are pointed to different web sites. In such browsers, the JavaScript module then attempts to read the "document.domain" attribute of the parent browser window using the reference obtained in step 122 (step 130). This will trigger an exception if the parent browser is pointed to a different web site than the child browser (step 132). If an exception occurs, error/exception handler module 106 is invoked (step 128) which may then initiate at least one action in response to the user exiting the web site (step 62 of FIG. 3). If no exception occurs even after performing step 130, it indicates that the parent browser and child browser are pointed to the same web site, implying that the user has not exited from the web site accessed in steps 52 and 54 depicted in FIG. 3. If the user has not exited the web site, processing continues with step 90 depicted in FIG. 5.

An exemplary JavaScript program for determining if a user has exited from a web site for non-Internet Explorer browsers is shown below:

```
// "Error Handler" function -- invoked when an exception occurs
function errortrap(msg,url,line)
{
// Call the action function e.g. "Show Survey Invitation" JavaScript
function.
setTimeout ("goToSurvey( );", 1, "JavaScript");
return true;
}
// Function handleTimeout( ) is called each time the timer expires
// (e.g. every 1 second) with non-IE
// Browsers.
function handleTimeout( )
{
// obtain the "refernce" to the parent browser's window.
    hParent = window.opener;
if (hParent == null)
{
//alert ("couldn't find parent");
}
else
{
// Inspect the "name" variable. If the browser is on the same web
// domain as the web page in the child browser, then this succeeds.
// Otherwise, this causes a JavaScript "exception" to occur.
// This means that the subsequent line of code won't execute.
// Instead, the "Error Handler" function will be called - and that
// function will initiate at least one action e.g. call the "Show Survey
// Invitation" code.
    var strName = hParentname;
    if(strName != "MyParent")
    {
//alert ('could rot read parent');
    window.focus ( );
    var theTimer3 = setTimeout ("goToSurvey( );", 1, "JavaScript");
    }
        else
        {
        //alert ("parent:" + strName);
    setTimeout ("handleTimeout( );", 1000, "JavaScript");
// Try to read the "domain." If the parent browser is pointed at a
// different web domain than the child browser, an exception will occur
// and then the "Error Handler" will be called.
        if (this.document.domain != hParent.document.domain)
        {
        }
    }
}
} 'end of function handle Timeout( )
```

Referring back to FIG. 3, if it is determined that the user has exited from the web site accessed in steps 52 and 54, at least one action may then be initiated according to the teachings of the present invention (step 62). A variety of actions may be performed by the present invention in response to the user's exit from the web site.

Figure 9:
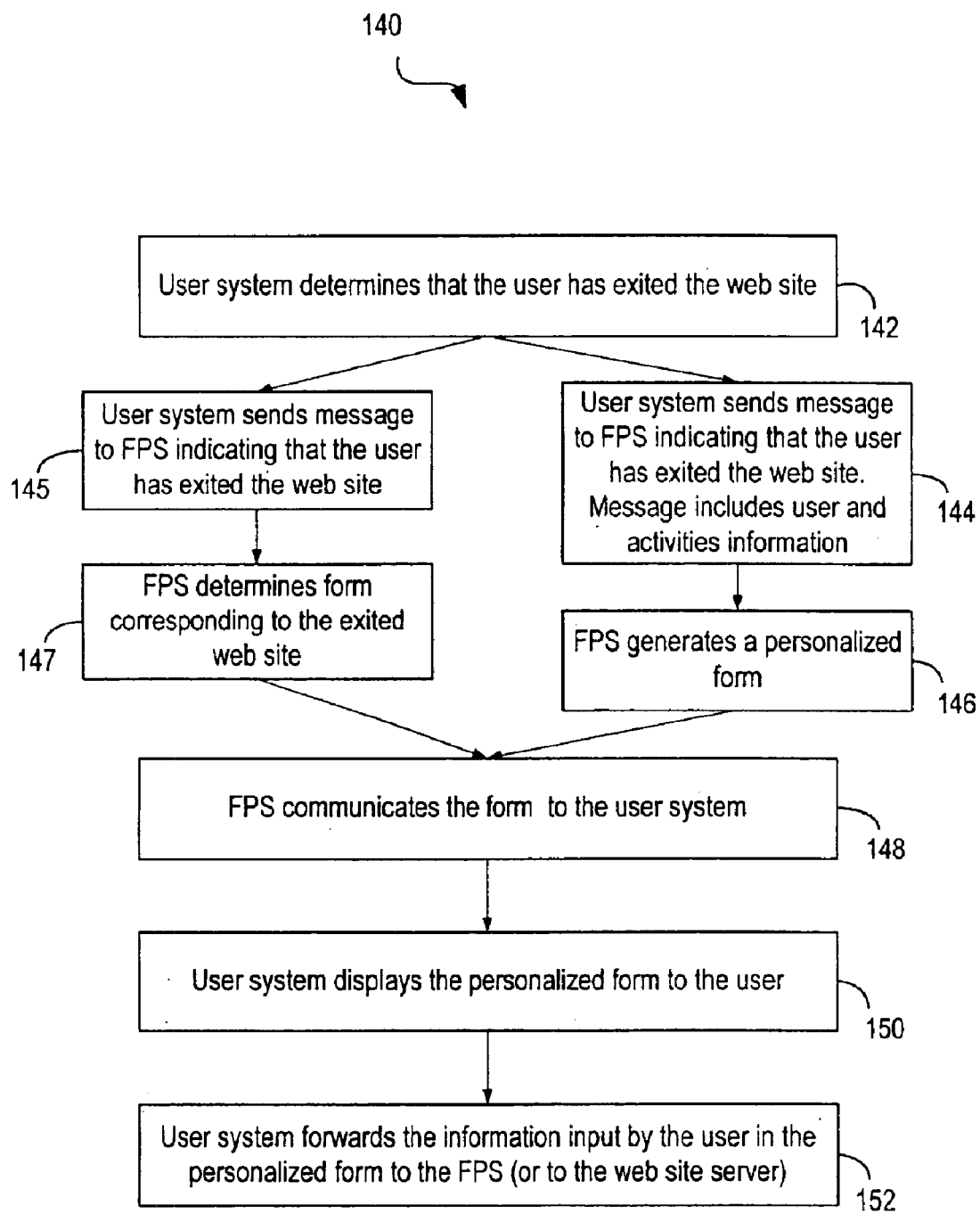
FIG. 9 depicts a simplified flowchart showing processing performed by an embodiment of the present invention for displaying a form to a user.

In a specific embodiment of the present invention, a data form or survey form ("form" in general) is presented to the user for user feedback. FIG. 9 depicts a simplified flowchart 140 showing processing performed by embodiments of the present invention for displaying a form to the user. As shown in FIG. 9, processing is initiated when user system 12 determines that the user has exited the web site accessed in steps 52 and 54 of FIG. 3 (step 142). According to one embodiment of the present invention, a message is sent from user system 12 to FPS 14 indicating that the user has exited the web site (step 145). Upon receiving the message from user system 12, FPS 14 determines the a form corresponding to the web site (step 147). The form determined in step 147 is then communicated to user system 12 (step 148).

According to another embodiment of the present invention, user system 12 sends a message to FPS 14 indicating that the user has exited the web site (step 144). The message also contains user-related and user activities-related information to FPS 14. The information downloaded to FPS 14 may include information collected by user system 12 during step 58 in FIG. 3, user profile information stored by user system 12, or any other user related information accessible to user system 12.

Upon receiving the information from user system 12, FPS 14 automatically generates a personalized form for the user (step 146). The personalized form may be generated based upon information received from user system 12 during step 146, and based upon other information accessible to FPS 14 such as information related to the user or information related to the user's interactions with the web site stored by FPS 14. The information used for personalization of the form may include information related to the user's name, address, demographics, previous purchase history, previous web site interaction history, service history, and other like information. The personalized form generated in step 146 is then communicated from FPS 14 to user system 12 (step 148). User system 12 then displays the form received from FPS 14 to the user (step 150).

In alternate embodiments of the present invention, the form(s) may be stored or generated by the web server storing the web site which the user has exited. In this embodiment, user system 12 communicates with the web server (instead of FPS 14) to receive the form.

After the user fills the form, the information input by the user on the form may be communicated by user system 12 to FPS 14 or to the web server system hosting the web site (step 152). Input information provided by the user may be analyzed to find answers to questions such as: what will attract users back to the web site, why users chose to or chose not to buy something at the web site, what different categories of users liked/disliked the web site, how easily users could find the web site on the web, what were the users looking for on the web site, which advertisements displayed by the web site were found to be compelling by the users, how users' impressions of company brands or company products changed after visiting the web site of the company, demographics about the users such as age, gender, household income, etc., computer, operating system and browser used by the users, how the web site compares to other web sites that the users have experienced, and other like information. Other types of analysis may also be performed on the information input by the user.

FIGS. 10A and 10B depict an exemplary form which may be displayed to the user according to an embodiment of the present invention. The form is generated when a user exits an insurance web site, namely the "AcmeInsurance.com" web site.

According to the teachings of the present invention, a form is presented to the user only after the user has exited from the web site. Consequently, the user's transaction flow while browsing the web site is not interrupted as with conventional pop-up form systems. This raises respondent satisfaction and improves response rates. Additionally, personalized forms generated by embodiments of the present invention offer several benefits over conventional generic forms. Since personalized forms more accurately represent the user's behavior, the user is prompted only for that information which is relevant to the user. This reduces the amount of time that the user has to spend in responding to the form. Personalized forms also increase the accuracy of the responses received from the user. Consequently, personalization raises overall respondent satisfaction which translates to better response rates from the users. This further raises respondent satisfaction and improves response rates.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware or only in software or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A computer-implemented method of initiating an action upon exit from a web site, the method comprising:
   accessing the web site using a first browser executing on a user system;
   upon accessing the web site, performing processing at the user system to periodically monitor if the first browser has exited the web site; and
   initiating the action upon determining that the first browser has exited the web site, wherein initiating the action comprises:
   communicating a message from the user system to a server upon determining that the first browser is not accessing the web site;
   receiving a form at the user system from the server in response to the message; and
   outputting the form via the user system.

2. The method of claim 1 wherein:
   the message includes information related to a user of the first browser and information related to one or more activities performed by the user at the web site; and
   the form received at the user system from the server is personalized for the user based upon the information related to the user and one or more activities included in the message.

3. The method of claim 1 wherein accessing the web site comprises accessing a first web page stored by the web site using the first browser.

4. The method of claim 3 wherein performing processing at the user system comprises:
   opening a second browser on the user system;
   loading a second web page from the web site into the second browser; and
   initiating a timer on the user system, the timer configured to generate a signal at periodic time intervals.

5. The method of claim 4 wherein the second browser is minimized.

6. The method of claim 4 further comprising:
   monitoring, when a signal is generated by the timer, one or more user activities performed by a user of the first browser at the web site; and
   determining, when a signal is generated by the timer, if the first browser has exited the webite.

7. The method of claim 6 wherein monitoring the one or more user activities comprises:
   collecting information related to the user; and
   collecting information related to one or more activities performed by the user at the web site.

8. The method of claim 7 wherein:
   the form received at the user system is based upon the information related to the user and the information related to the one or more activities performed by the user at the web site.

9. The method of claim 6 wherein determining if the first browser has exited the web site comprises:
   obtaining a reference to the first browser's window;
   inspecting an attribute of the first browser window using the reference to the first browser's window; and
   determining if an error occurred due to inspecting the attribute, the occurrence of the error indicating that the first browser has exited the web site.

10. The method of claim 9, wherein the attribute is a name attribute.

11. The method of claim 6 wherein determining if the first browser has exited the web site comprises:
    obtaining a reference to the first browser's window;
    inspecting a name variable of the first browser window using the reference to the first browser's window; and
    determining if an exception occurred due to inspecting the name variable, the occurrence of the exception indicating that the first browser has exited the web site.

12. The method of claim 11 further comprising:
    if no exception occurred due to inspecting the name variable:
    inspecting a document domain attribute of the first browser window using the reference to the first browser's window; and
    determining if an exception occurred due to inspecting the document domain attribute, the occurrence of the exception indicating that the first browser has exited the web site.

13. A computer-implemented method of initiating an action upon exit from a web site, the method comprising:
    accessing the web site by accessing a first web page stored by the web site using a first browser;
    opening a second browser;
    loading a second web page from the web site into the second browser;
    initiating a timer configured to periodically generate a signal after a time period;
    collecting, in response to a signal generated by the timer, information related to a user of the first browser and the user's one or more activities at the web site; and
    determining, in response to a signal generated by the timer, if the first browser has exited the web site; and
    initiating the action upon determining that the first browser has exited the web site, wherein initiating the action comprises:
    communicating the information related to the user and one or more activities performed by the user at the web site to a server;
    receiving a form from the server, the form generated by the server based upon the information related to the user and the user's one or more activities at the web site; and
    displaying the form to the use.

14. The method of claim 13 wherein determining if the first browser has exited the web site comprises:
   obtaining a reference to the first browser's window;
   inspecting an attribute of the first browser window using the reference to the first browser's window; and
   determining if an error occurred due to inspecting the attribute, the occurrence of the error indicating that the first browser has exited the web site.

15. The method of claim 14 wherein the attribute is a name attribute.

16. The method of claim 13 wherein determining if the first browser has exited the web site comprises:
   obtaining a reference to the first browser's window;
   inspecting a name variable of the first browser window using the reference to the first browser's window; and
   determining if an exception occurred due to inspecting the name variable, the occurrence of the exception indicating that the first browser has exited the web site.

17. The method of claim 16 further comprising:
   if no exception occurred due to inspecting the name variable:
      inspecting a document domain attribute of the first browser window using the reference to the first browser's window; and
      determining if an exception occurred due to inspecting the document domain attribute, the occurrence of the exception indicating that the first browser has exited the web site.

18. A computer-implemented method of performing an action upon exit from a first web site, the method comprising:
   accessing the first web site by accessing a first web page stored by the first web site using a first browser;
   outputting the first web page via the first browser;
   upon outputting the first web page, performing processing to periodically monitor if the first browser has exited the first web site; and
   performing the action upon determining that the first browser has exited the first web site, wherein performing the action comprises:
      communicating a message to a server;
      receiving a form from the server in response to the message; and
      outputting the form via the first browser.

19. The method of claim 18 wherein performing the processing comprises:
   opening a second browser;
   loading a second web page from the first web site into the second browser;
   executing a timer configured to generate a signal at periodic intervals; and
   inspecting, in response to the signal periodically generated by the timer, an attribute of the web page displayed in the first browser to determine if the first browser has exited the first web site.

20. A system for performing an action upon exit from a first web site, the system comprising:
   a processor;
   a memory coupled to the processor, the memory configured to store a plurality of code modules for execution by the processor, the plurality of code modules comprising:
      a code module for accessing the first web site by accessing a first web page stored by the first web site using a first browser;
      a code module for outputting the first web page via the first browser;
      upon outputting the first web page, a code module for performing processing to monitor if the first browser has exited the first web site; and
      a code module for performing the action upon determining that the first browser has exited the first web site, wherein the code module for performing the action comprises:
      a code module for communicating a message to a server upon determining that the first browser has exited the first web site;
      a code module for receiving a form from the server in response to the message; and
      a code module for outputting the form via the first browser.

21. The system of claim 20 wherein the code module for performing processing to monitor if the first browser has exited the first web site comprises:
   a code module for opening a second browser;
   a code module for loading a second web page from the first web site into the second browser;
   a code module for executing a timer configured to generate a signal at periodic intervals; and
   a code module for inspecting, in response to the signal periodically generated by the timer, an attribute of the web page displayed in the first browser to determine if the first browser has exited the first web site.

22. A network system for initiating an action when a user exits a web site, the system comprising:
   a communication network;
   a plurality of web servers coupled to the communication network, the plurality of web servers including a first web server configured to host the web site; and
   a user system coupled to the communication network;
   wherein the user system accesses the web site by accessing a first web page stored by the web site using a first browser executing on the user system;
   wherein the user system, upon accessing the web-site, is configured to perform processing to periodically monitor if the first browser has exited the web site; and
   wherein the user system is configured to initiate the action upon determining that the first browser has exited the web site, wherein the user system is configured to initiate the action by:
      communicating a message to a second server upon determining that the first browser has exited the web site; and
      receiving a form generated by the second server; and
      displaying the form to the user.

23. The system of claim 22 wherein the user system is configured to determine if the first browser has exited the web site by:
   opening a second browser on the user system;
   loading a second web page from the web site into the second browser; and
   initiating a timer which is configured to generate a signal at periodic time intervals;
   collecting, when a signal is generated by the timer, information related to a user of the user system and information about one or more activities performed by the user at the web site; and
   determining, when a signal is generated by the timer, if the first browser has exited the web site.

24. The system of claim 23 wherein determining if the first browser has exited the web site comprises:
   obtaining a reference to the first browser's window;
   inspecting an attribute of the first browser window using the reference to the first browser's window; and
   determining if an error occurred due to inspecting the attribute, the occurrence of the error indicating that the first browser has exited the web site.

25. The system of claim 23 wherein the attribute is a name attribute.

26. The system of claim 23 wherein determining if the first browser has exited the web site comprises:
   obtaining a reference to the first browser's window;
   inspecting a name variable of the first browser window using the reference to the first browser's window; and
   determining if an exception occurred due to inspecting the name variable, the occurrence of the exception indicating that the first browser has exited the web site.

27. The system of claim 26 wherein determining if the first browser has exited the web site further comprises:
   inspecting a document domain attribute of the first browser window using the reference to the first browser's window; and
   determining if an exception occurred due to inspecting the document domain attribute, the occurrence of the exception indicating that the first browser has exited the web site.

28. The system of claim 23 further comprising:
   communicating the information related to the user and information about the one or more user activities at the web site to the second server, and
   wherein the form is generated by the second server based upon the information related to the user and information about the one or more user activities.

29. A computer program product stored on a computer readable storage medium for performing an action upon exit from a first web site, the computer program product comprising:
   code for accessing the first web site by accessing a first web page stored by the first web site using a first browser;
   code for outputting the first web page via the first browser;
   upon outputting the first web page, code for performing processing to periodically monitor if the first browser has exited the first web site; and
   code for performing the action upon determining that the first browser has exited the first web site, wherein the code for performing the action comprises:
      code for communicating a message to a server upon determining that the first browser has exited from the first web site;
      code for receiving a form from the server in response to the message; and
      code for outputting the form via the first browser.

30. The computer program product of claim 29 wherein the code for performing the processing comprises:
   code for opening a second browser;
   code for loading a second web page from the first web site into the second browser;
   code for executing a timer configured to generate a signal at periodic intervals; and
   code for inspecting, in response to the signal periodically generated by the timer, an attribute of the web page displayed in the first browser to determine if the first browser has exited the first web site.

31. A computer program product stored on a computer readable storage medium for initiating an action upon exit from a web site, the computer program product comprising:
   code for accessing the web site by accessing a first web page stored by the web site using a first browser;
   code for opening a second browser;
   code for loading a second web page from the web site into the second browser;
   code for initiating a timer configured to periodically generate a signal after a time period;
   code for determining, in response to the signal periodically generated by the timer, if the first browser has exited the web site; and
   code for initiating the action upon determining that the first browser has exited the web site, wherein the code for initiating the action comprises:
      code for communicating a message to a server upon determining that the first browser has exited the web site;
      code for receiving a form from the server; and
      code for displaying the form to the user.

32. The computer program product of claim 31 wherein the code for determining if the first browser has exited the web site comprises:
   code for obtaining a reference to the first browser's window;
   code for inspecting an attribute of the first browser window using the reference to the first browser's window; and
   code for determining if an error occurred due to inspecting the attribute, the occurrence of the error indicating that the first browser has exited the web site.

33. The computer program product of claim 32 wherein the attribute is a name attribute.

34. The computer program product of claim 31 wherein the code for determining if the first browser has exited the web site comprises:
   code for obtaining a reference to the first browser's window;
   code for inspecting a name variable of the first browser window using the reference to the first browser's window; and
   code for determining if an exception occurred due to inspecting the name variable, the occurrence of the exception indicating that the first browser has exited the web site.

35. The computer program product of claim 34 further comprising:
   code for inspecting a document domain attribute of the first browser window using the reference to the first browser's window if no exception occurred due to inspecting the name variable; and
   code for determining if an exception occurred due to inspecting the document domain attribute, the occurrence of the exception indicating that the first browser has exited the web site.

36. The computer program product of claim 31 further comprising:
   code for collecting, in response to the signal periodically generated by the timer, information related to a user of the first browser and the user's one or more activities at the web site;

code for communicating the information related to the user and the user's one or more activities at the web site to the server;

wherein the form received from the server is generated based upon the information related to the user and the user's one or more activities at the web site.

37. A computer-implemented method of initiating an action upon exit from a web site, the method comprising:

connecting to a web site using a first browser executing on a user system;

subsequent to connecting to the web site, performing processing at the user system to determine if the first browser is connected to the web site;

communicating a message from the user system to a server upon determining that the first browser is no longer connected to the web site;

receiving an electronic document at the user system from the server in response to the message; and outputting the electronic document via the user system.

* * * * *

UNITED STATES PATENT AND TRADEMARK OFFICE
CERTIFICATE OF CORRECTION

PATENT NO. : 6,892,347 B1
DATED : May 10, 2005
INVENTOR(S) : Williams et al.

It is certified that error appears in the above-identified patent and that said Letters Patent is hereby corrected as shown below:

<u>Column 14,</u>
Line 2, please delete "webite" and insert -- web site --.
Line 67, please delete "use" and insert -- user --.

<u>Column 16,</u>
Line 41, please delete "web-site" and insert -- web site --.

Signed and Sealed this

Eighth Day of November, 2005

JON W. DUDAS
*Director of the United States Patent and Trademark Office*